United States Patent [19]
Meyers

[11] Patent Number: 5,335,945
[45] Date of Patent: Aug. 9, 1994

[54] FLEXIBLE PIPE CONNECTOR

[75] Inventor: Theodore W. Meyers, Inverness, Ill.

[73] Assignee: Tuf-Tite, Inc., Wauconda, Ill.

[21] Appl. No.: 913,143

[22] Filed: Jul. 14, 1992

[51] Int. Cl.⁵ .......................................... F16L 21/00
[52] U.S. Cl. ................... 285/236; 285/383; 285/423; 285/903
[58] Field of Search ............... 285/236, 237, 383, 423, 285/903

[56] References Cited

U.S. PATENT DOCUMENTS

| | | | |
|---|---|---|---|
| 2,270,604 | 1/1942 | Roemhild | 285/383 |
| 3,695,643 | 10/1972 | Schmunk | 285/156 |
| 3,785,682 | 1/1974 | Schaller et al. | 285/24 |
| 3,825,288 | 7/1974 | Maroschak | 285/156 |
| 3,899,198 | 8/1975 | Maroschak | 285/287 |
| 4,061,368 | 12/1977 | Auriemma | 285/383 |
| 4,141,576 | 2/1979 | Lupke et al. | 285/369 |
| 4,172,607 | 10/1979 | Norton | 285/383 |
| 4,247,136 | 1/1981 | Fouss et al. | 285/319 |
| 4,663,036 | 5/1987 | Strobl, Jr. et al. | 285/110 |
| 4,690,414 | 9/1987 | Haaland | 285/110 |
| 4,702,502 | 10/1987 | Shade et al. | 285/903 |
| 4,747,621 | 5/1988 | Gans et al. | 285/7 |
| 4,763,695 | 8/1988 | Dooley | 285/236 |
| 4,779,902 | 10/1988 | Lee | 285/423 |
| 4,865,357 | 9/1989 | Brinegar | 285/55 |
| 4,909,547 | 3/1990 | Guy | 285/169 |
| 4,915,425 | 4/1990 | Hegler et al. | 285/179 |
| 4,923,227 | 5/1990 | Petty et al. | 285/319 |
| 5,042,844 | 8/1991 | Iida et al. | 285/7 |
| 5,060,983 | 10/1991 | Lee | 285/39 |
| 5,180,195 | 1/1993 | Petroff et al. | 285/231 |
| 5,180,196 | 1/1993 | Skinner | 285/253 |
| 5,180,197 | 1/1993 | Thompson, Jr. | 285/351 |

FOREIGN PATENT DOCUMENTS 2906317 2/1979 Fed. Rep. of Germany ...... 285/903

OTHER PUBLICATIONS

*Modern Plastics Encyclopedia*, 1986–1987, p. 62.

*Primary Examiner*—P. Austin Bradley
*Assistant Examiner*—Jeffrey T. Knapp
*Attorney, Agent, or Firm*—Tilton, Fallon, Lungmus & Chestnut

[57] ABSTRACT

A flexible pipe connector is disclosed having two female ends, each for receiving a length of corrugated pipe and creating a gravity flow water-tight seal between the two lengths of corrugated pipe. The flexible pipe connector is made of flexible, stretchable plastic material, with each female end having a receiving length with a mouth at a first end thereof and a stopping flange at a second end thereof. Each female receiving end is constructed to stretch radially outward along a substantial length of the corrugated pipe which is inserted into the mouth and receiving length, such that the receiving length exerts radially inward compressive forces against the outer diameter of the corrugated pipe effectuating a gravity flow water-tight seal. The invention also includes a male-to-female form of connector having a female end and a male end, which coupler is adapted to be used to connect a corrugated pipe to a flexible seal member of a drop box and is able to receive a speed leveling device. Additionally, a female-to-female connector for use in sealably connecting smooth-walled, hard plastic drain pipes. Clamp means are disclosed to assist the flexible pipe connector in creating a pressure water-tight seal.

27 Claims, 3 Drawing Sheets

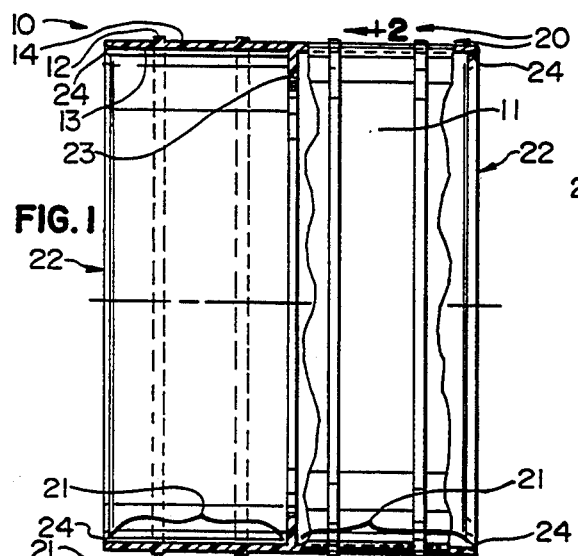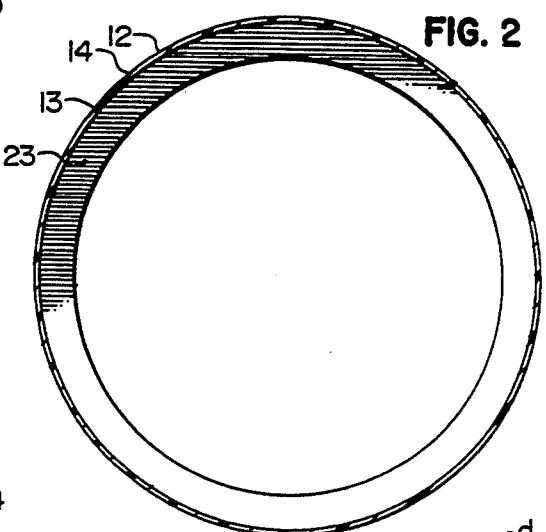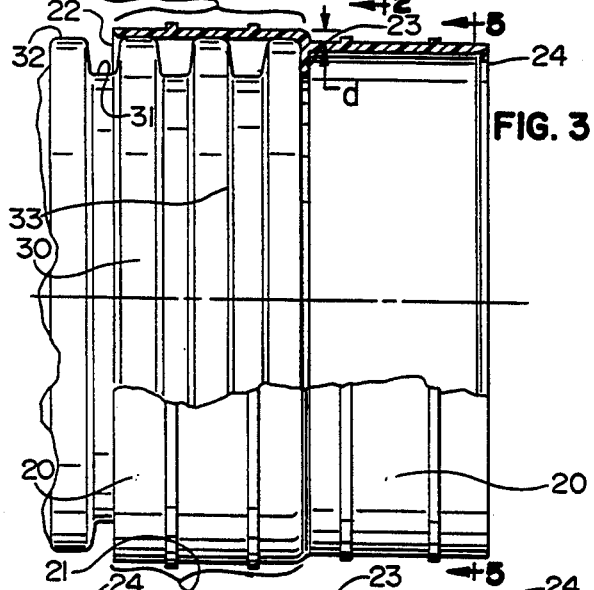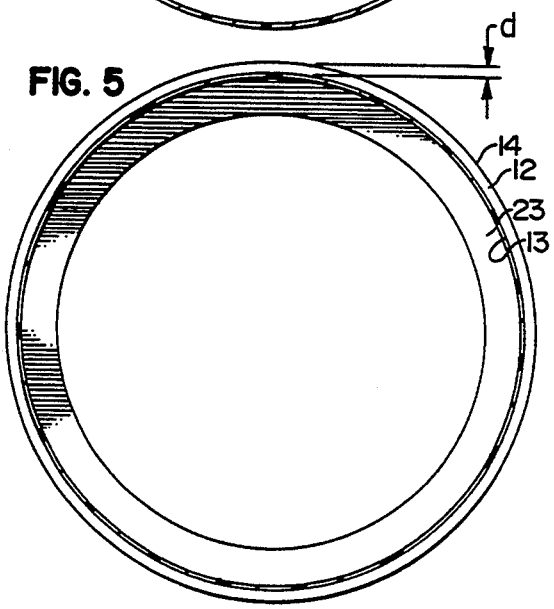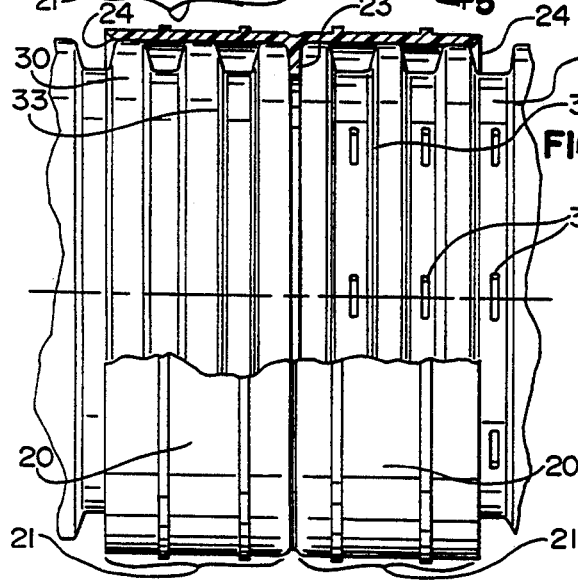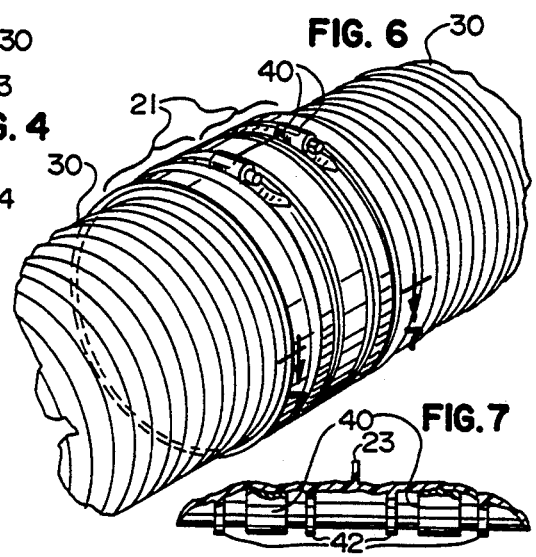

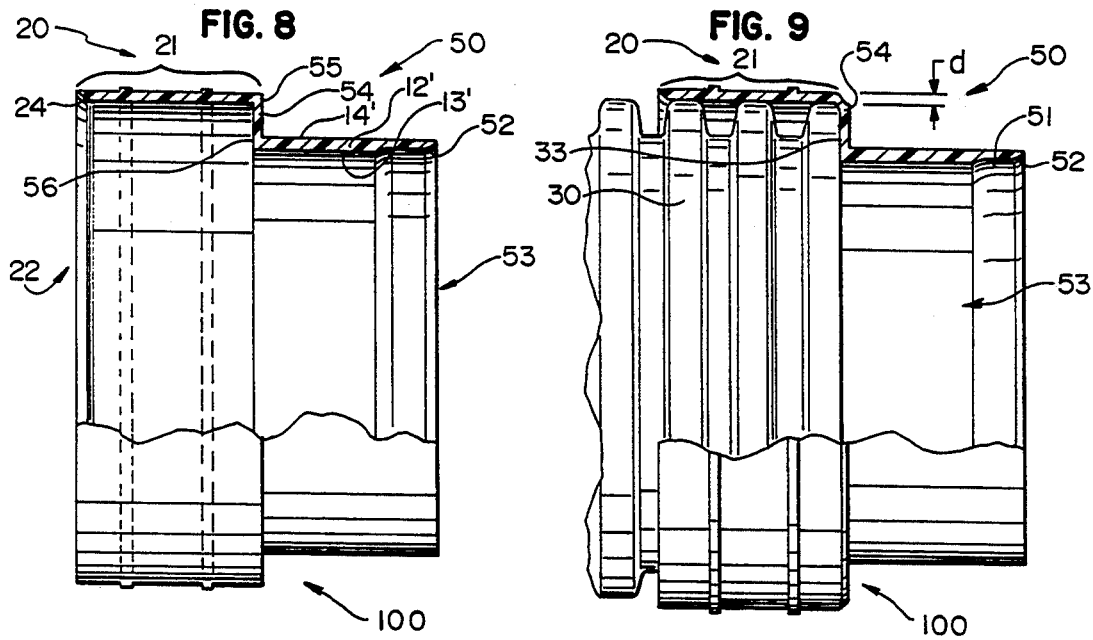
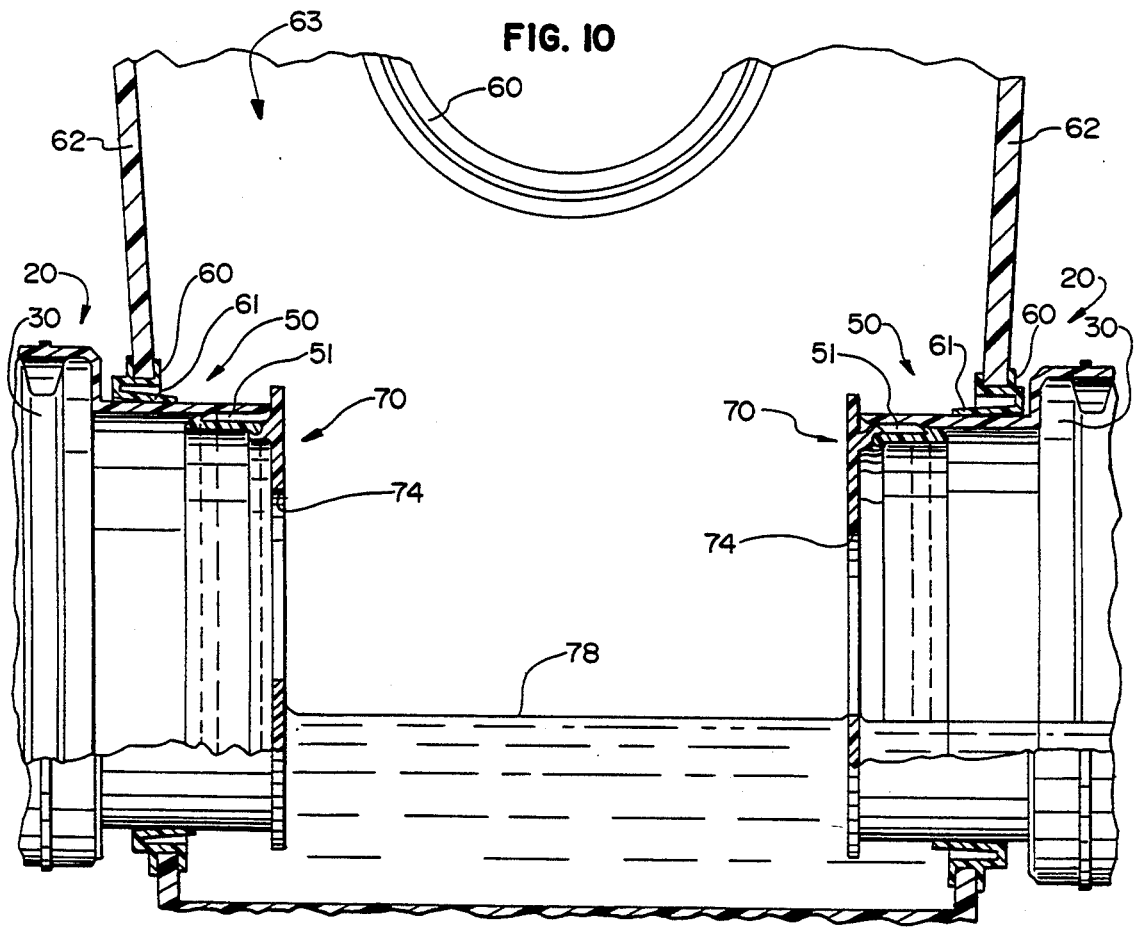

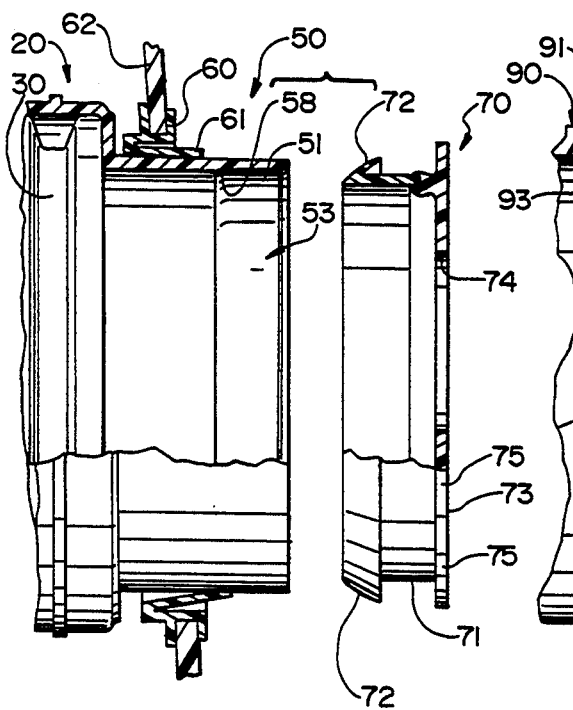
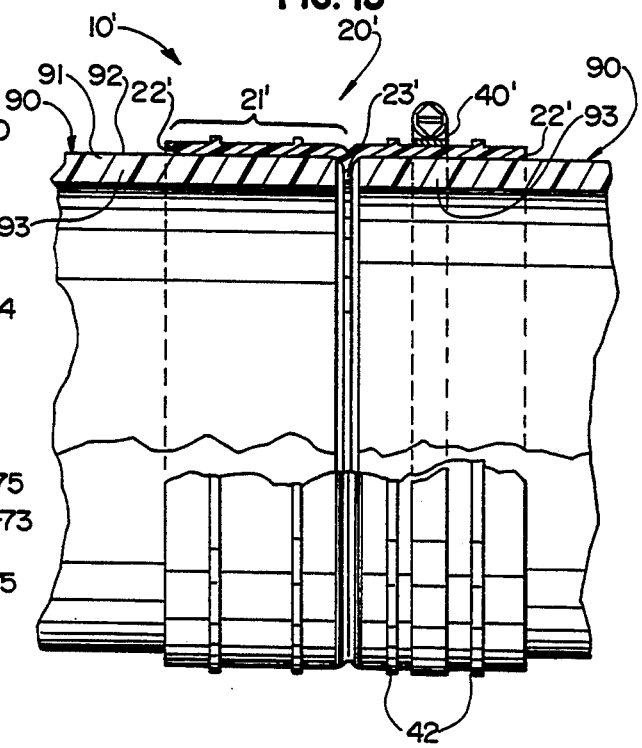
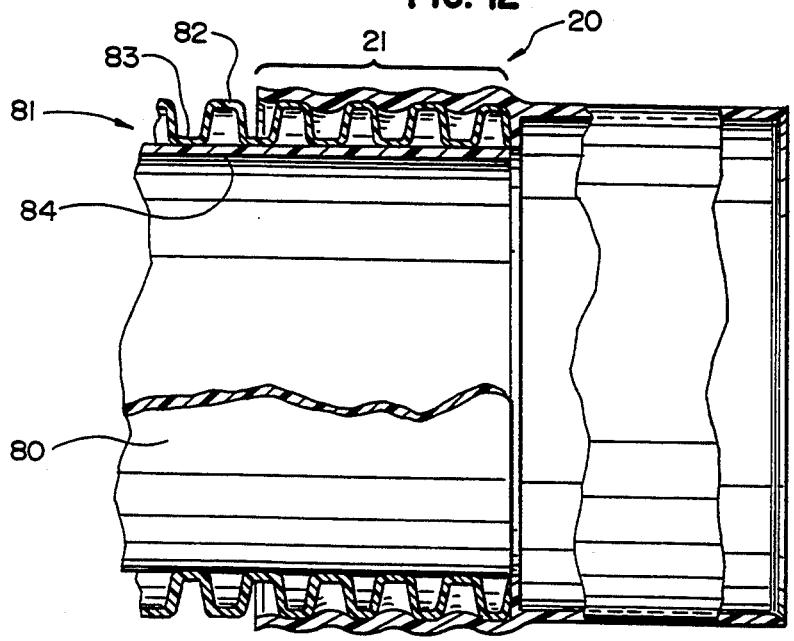

FLEXIBLE PIPE CONNECTOR

BACKGROUND OF THE INVENTION

This invention relates to a flexible pipe connector for interconnecting lengths of corrugated pipe and creating a water-tight gravity flow seal between the lengths of corrugated pipe, or with use of a suitable fastener, to create a water-tight pressure seal connection. In addition, the invention can be adapted to have a male and female end so that the female end can receive a length of corrugated pipe and the male end can be inserted into a flexible seal member used with septic system and drainage components, the male end being further adapted to receive in its inner diameter a leveling device. Alternatively, the male end can be inserted into a smooth-walled hard plastic fitting (PVC, ABS, or the like), such as a "T" or elbow fitting, for example. Also, a female-to-female version of the subject invention can be used to sealably connect abutting ends of smooth-walled, hard plastic pipe.

Currently, corrugated plastic pipe is widely used for farm field drainage, septic systems, drain tiles, and many other similar uses. Corrugated plastic pipe, such as the so-called 1500 lb. crush corrugated pipe, for example, is relatively inexpensive and can be obtained commercially in straight lengths, normally 10 feet long, or in rolls of up to 100 or more feet. Also, while plastic corrugated pipe is normally sold in a 4" diameter size, it is also available in other diameters, such as from 2" to 36", for example.

Some corrugated plastic pipe is sold with perforations or holes formed along the longitudinal length of the pipe so that water, sanitary effluent, or other fluids carried in the pipe can seep out of the perforations or holes so as to drain the same, such as into associated septic leach fields. Although corrugated pipe with such perforations or holes is widely used, non-perforated corrugated pipe is also used for a wide variety of applications for which perforated corrugated pipe would not be appropriate. As an example, farmers needing to drain low spots in a field need a water-tight corrugated pipe to provide a means for communicating water from the low spots to a distant drainage area. Also, there are many areas where local zoning codes would allow use of non-perforated corrugated pipe for septic systems, if only a suitable sealed coupler were available. Although corrugated plastic pipe is relatively inexpensive and easy to obtain, there are few known couplers for providing a water-tight seal, and what water-tight couplings are available are relatively expensive in comparison to the cost of corrugated plastic pipe.

One known coupler used for forming a fluid-tight seal includes an annular sealing gasket which fits into one or more grooves at the end of each piece of corrugated pipe. After such a sealing gasket is placed on each end of corrugated pipe, each pipe end is placed into a hard plastic cylindrical connector to produce a relatively water-tight seal. Such a known connector, including the two rubber gaskets and a hard plastic cylindrical connector, is quite expensive when compared with the cost of corrugated pipe. Additionally, this connector requires the installer to work each rubber gasket over each end of corrugated pipe until it is received in one or more grooves on the outer diameter of the corrugated pipe. Then, the user must force each end of the corrugated pipe into the hard plastic connector. This operation requires a multitude of steps which may be difficult to perform in the field and require an unwarranted expenditure of time.

Another coupling for forming a fluid-tight seal provides a heat-shrinkable sleeve as disclosed in U.S. Pat. No. 4,141,576. That heat-shrinkable sleeve has a pipe end placed in each end thereof and is then shrunk via application of heat onto the abutting end portions of the pipes to create a frictional engagement between each section of pipe. The heat-shrinkable sleeve is made of a thermoplastic material having elastic memory so that when it is heated, it shrinks to relieve stresses which were introduced into the sleeve during manufacture, i.e., it will not resume its original shape. Although this known coupling provides a fluid-tight seal, the heat-shrinkable sleeve is relatively difficult and expensive to manufacture, requires the performance of a heat-shrinking operation which may be difficult in many field situations, and requires an expense in excess of the cost of the corrugated pipes being connected.

Other means for connecting lengths of corrugated plastic pipe are known in the art, however, these means often do not effectuate a water-tight seal between the lengths of corrugated pipe. One such coupling has a generally cylindrical body and a mouth at both ends for receiving the ends of pipe to be connected. The inner circumference of the cylindrical body has a plurality of deflectable cleats for engaging the outer corrugations of the corrugated pipe so that the pipe is longitudinally retained in the mouth of the coupling. This type of coupling is formed of relatively rigid plastic material, is relatively expensive, and does not provide a water-tight seal, i.e., it does not closely conform to the corrugated pipe's outer surface in use. For an example of such a coupling, reference may be had to U.S. Pat. No. 3,695,643.

Another device known in the art for innerconnecting lengths of corrugated pipe is to provide an internal coupling structure having a plurality of integrally molded cleats extending generally radially outward from the surface of the coupler to engage the inner corrugations of the length of corrugated pipe. Such a coupling structure is relatively expensive, is difficult to use in the field and again does not provide a fluid-tight seal between the lengths of corrugated pipe as it is substantially rigid. For an example of such an internal coupling structure, reference may be had to U.S. Pat. No. 4,247,136.

In addition to being used to interconnect lengths of corrugated pipe, the flexible pipe connector of the present invention can be used to connect lengths of so-called dual-wall co-extruded pipe. Such dual-wall co-extruded pipe normally has an outer corrugated diameter and an inner smooth diameter with a hollow space existing between the inside of the corrugation and the outside of the inner smooth wall. This type of pipe is normally sold in 10-foot straight lengths, in diameters from 4" to 36" or more, and is often used as a substitute for the well known smooth wall PVC pipe. This is because such dual-wall co-extruded pipe is more advantageous as it provides the strength of PVC pipe, but is usually less expensive as it does not require as much material since the space between the corrugations and the inner wall is hollow. Currently, dual-wall co-extruded pipe is connected in a water-tight seal by using a gasket or O-ring on each end of pipe to be insertably engaged into a hard plastic coupling, similar to the corrugated fitting noted above. However, such a coupling is relatively expensive especially when used with dual-wall co-extruded pipe. Since the latter is only sold in 10-foot or 20-foot lengths, an expensive coupling is required every 10 feet, which expense limits the applications for such dual-walled pipe.

SUMMARY OF INVENTION

The flexible pipe connector of the present invention addresses the above problems by providing an inexpensive, universal, fluid-tight seal between lengths of corrugated pipe. The flexible pipe connector comprises a flexible and stretchable tube-like member having a cylindrical wall with inner and outer surfaces, said member defining at least one female end. The female end has a receiving length with a mouth at a first end thereof and a stop means at a second or inner end thereof, the mouth being adapted to slidably receive an end portion of a corrugated pipe so that the pipe end can be inserted a distance into the receiving length until said pipe end contacts the stop means. The receiving length of the female end is constructed to stretch radially outward along a substantial length of the corrugated pipe which is inserted into the mouth and receiving length so that the receiving length exerts radially inward compressive forces against the corrugated pipe effectuating a water-tight gravity flow seal.

The female end of the flexible pipe connector can also be used in combination with a clamp means, such as a radiator band clamp for example, to provide a pressure flow water-tight seal between abutting lengths of corrugated pipe.

In another embodiment, the female end can be coupled with a male end, the male end being adapted to be insertable into a flexible seal member of a septic system component, e.g., a drop box or into the mouth of a smooth-walled hard plastic pipe fitting, such as a "T" elbow, "Y", 45° or the like. The inner diameter surface of the male end has an inner, generally radially-extending ledge for receiving a reverse wiper member of a leveling device. In use, a length of corrugated pipe can be connected to the female end, with the male end can be inserted into a flexible seal formed in the sidewall of a drop box, and a leveling device (such as the Speed Leveler (trademark) sold by the assignee of the present application) can be inserted into the mouth opening in the male end. Thus, such a male-to-female connector can form a fluid-tight seal between the corrugated pipe and the drop box, and can directly accommodate the leveling device.

It is a primary object of the present invention to provide an inexpensive gravity flow fluid-tight seal between the ends of two lengths of corrugated pipe, or of smooth-walled, hard plastic pipe.

It is a further object to provide a fluid-tight seal between the ends of dual-wall co-extruded pipe.

It is yet a further object of the present invention to provide a male-to-female connector for receiving a length of corrugated pipe in the female end and insertably connecting the male end to a flexible sealing member of a septic system component, with the male end being further adapted to receive a leveling device in the mouth opening of the male end.

It is yet another object to connect corrugated pipe to smooth-walled fittings.

The means by which the foregoing and other objects of the present invention are accomplished and the manner of their accomplishment will be readily understood from the following specification upon reference to the accompanying drawings, in which:

FIG. 1 is a side elevation view, in partial cross-section, of a female-to-female flexible pipe connector made in accordance with the present invention.

FIG. 2 is a cross-sectional view of the connector of FIG. 1, taken at lines 2—2 thereof.

FIG. 3 is another side elevation view, partially in section for better viewing, of the flexible pipe connector of the present invention, as shown connected to a length of corrugated pipe.

FIG. 4 is another side elevation view, partially in sections and similar to FIG. 3, but shown with a corrugated pipe inserted into both female ends.

FIG. 5 is a cross-sectional view of the flexible pipe connector taken at lines 5—5 of FIG. 3

FIG. 6 is a perspective view of a flexible pipe connector with a length of corrugated pipe inserted in each female end thereof and a pair of radiator clamps disposed about each female end.

FIG. 7 is a partial cross-sectional view of a central portion of the connector of FIG. 6, taken at line 7—7 thereof.

FIG. 8 is a side elevation view, partly in section, of a male-to-female embodiment of the flexible pipe connector of the present invention.

FIG. 9 is a side elevation view, partly in section, of the male-to-female connector of FIG. 8, and shown connected to a length of corrugated pipe.

FIG. 10 is a side sectional view of a drop box shown with a pair of male-to-female flexible pipe connectors of the present invention, with a length of corrugated pipe inserted into each female end, and depicting a leveling device inserted into each male end.

FIG. 11 is an exploded side elevation view, partly in section, of the male-to-female flexible pipe connector of FIG. 10, and depicting a leveling device in partial cross-section.

FIG. 12 is a side elevation view, partially in section, of a female-to-female flexible pipe connector of the present invention as shown connected with a length of dual-wall co-extruded pipe.

FIG. 13 depicts a female-to-female connector of the present invention, connecting abutting ends of smooth-walled, hard plastic pipe.

DESCRIPTION OF THE PREFERRED EMBODIMENT

Having reference to the drawings, the preferred embodiment of the present invention is illustrated in FIG. 1 as a female-to-female flexible pipe connector 10 formed as a flexible and stretchable generally tube-like member 11. The flexible stretchable member 11 has a cylindrical wall 12 with an inner surface 13 and an outer surface 14. The numeral 20 designates a female end 20 having a receiving length 21 with a mouth 22 at one end and an annular flange 23 at the other end. The annular flange 23 acts as stop means for preventing further insertion of a pipe end 33 into the mouth 22 of the female end 20. In this depiction, the stop means is shown as an inwardly-projecting annular flange 23, which extends from the inner surface 13. However, any stop means, such as a plurality of protrusions or cleats, may be used to limit the inward travel of a length of pipe 30 and inserted into the flexible pipe connector 10. A section of the inner wall surface 13 adjacent the mouth 22 is formed with a female chamfer 24; it is present to facilitate insertion of the pipe end 33 into the connector mouth 22.

The cylindrical wall 12 of connector 10 preferably has a thickness in the range of from 0.02 inches to 0.04 inches, and preferably, is about 0.030 inches; this wall thickness provides the necessary flexible and stretchable properties needed of the flexible pipe connector 10 to effectuate a water-tight seal to any corrugated pipe connected therewith. The cylindrical wall 12 preferably has as little draft formed on its inner wall surface 13 as possible. However, the wall 12 can be formed with a draft of approximately 0.5 degree, as may be necessary in the plastic injection molding process preferably used to form the flexible pipe connector 10, without affecting its pipe-sealing capabilities.

In FIG. 2, an end view of the flexible pipe connector 10 is shown illustrating the annular flange 23 extending radially inward from wall surface 13. Preferably, the flange 23 extends into the connector 10 a distance less than the thickness of the corrugated pipe 30 for which the connector is to be used.

FIG. 3 illustrates the sealed connection formed between a piece of corrugated pipe 30 having a pipe end 33 and the flexible pipe connector 10. The corrugated pipe 30 is of the type commonly known as having a series of concentric, radially-extending valleys 31 and crests 32. The pipe end 33 is inserted into the mouth 22 of the female end 20 until the pipe end 33 contacts the annular flange 23. Along the receiving length 21 of the female end 20, the crests 32 of the corrugated pipe 30 so forcibly engage the inner wall surface 13 as to stretch the receiving length 21 radially outward along that end length of corrugated pipe 30 that is inserted into the flexible pipe connector 10. Since the cylindrical wall 12 of the female end 20 is purposely formed to be sufficiently thin, and preferably about 0.030 inches, it stretches along the receiving length 21. In this manner, the stretched connector wall 12 exerts radially inward compressive forces against the multiple crests 32 of the corrugated pipe 30 thereby creating a water-tight gravity flow seal between the corrugated pipe 30 and the flexible pipe connector 10. Injection-molded linear low-density polyethylene is the preferred material used in forming connector 10, as it provides the proper amount of tear-resistance, flexibility and stretchability needed to create the gravity flow water-tight seal with a corrugated pipe 30, and further, is inert. However, any other similar inert, flexible, tear resistant, and stretchable material can be used to form connector 10 without affecting the operation thereof.

FIG. 4 illustrates the female-to-female embodiment of the flexible pipe connector 10 having a length of corrugated pipe 30 inserted into each respective female end 20. One of the corrugated pipes 30 is shown as including a series of perforations 34 for discharging fluid into the accompanying drain field (not shown). Thus, FIG. 4 illustrates how the flexible pipe connector of the present invention can be used to connect water-tight corrugated pipe to perforated corrugated pipe. It should be noted that the cylindrical wall 12 along each receiving length 21 is stretched radially outward along each length of corrugated pipe 30 where inserted into each respective female end 20. This stretching property is illustrated as a deformation (generally denoted by reference letter d) about the circumference of the receiving length 21 (see FIG. 5). Although the corrugated pipe 30 only contacts the inner surface 13 with crests 32, the cylindrical wall 12 along the receiving length 21 remains substantially parallel to a longitudinal axis of the flexible pipe connector 10.

FIG. 6 illustrates the female-to-female flexible pipe connector 10 shown with a length of corrugated pipe 30 inserted into each respective female end 20. A suitable clamping means, shown in this embodiment as a pair of radiator clamps 40, is circumferentially placed about the outer surface 14 of the tubing wall 12 generally centered about the receiving lengths 21 of each respective female end 20. The upstanding annular ribs 42 carried on surface 14 serve as a guide for locating the clamp 40 in the center of each respective female end 20. The radiator clamps 40 are preferably made of stainless steel and can be releasably tightened in a well-known manner to increase the radially inward compressive forces already caused by the stretched expansion of the connector 10 along the receiving lengths 21. Thus, the additional compressive forces created by clamps 40 provide a pressure fluid-tight seal between the two lengths of corrugated pipe 30.

When the female-to-female flexible pipe connector 10 is used in conjunction with a suitable clamping means, such as radiator clamps 40 (shown), or a suitable alternative fastener, such as a ratcheting-type plastic clamp (not shown), the pressure seal provided thereby is able to withstand a pressure in the range of between 5 and 10 p.s.i. or more. That pressure is sufficient to allow corrugated pipe 30, when used with a connector 10 having clamps 40, to create a substantially water-tight system, such as can be conveniently and inexpensively used in a residential sanitary system, for example.

For a more detailed depiction of the annular ribs 42, reference may be had to FIG. 7 which shows a pair of upstanding annular ribs 42 disposed on the outer surface 14 of each receiving length 21 of each respective female end 20. The radiator clamps 40 are positionally located in the center of each pair of annular ribs 42 to ensure a proper pressure flow fluid-tight seal (of each connector wall 12 against pipe 30). However, such ribs 42 are not required for the successful operation of clamps 40 to assist connector 10 in creating a pressure water-tight seal.

A male-to-female embodiment 100 of the flexible pipe connector of the present invention, and having a female end 20 and a male end 50, is illustrated in FIG. 8. The female end 20 is the same as described above, however, the stop means is formed by an annular ring 54 which is connected at one annular edge to the cylindrical wall 12 of the female end 20 and connected at an opposite annular edge 55 to the wall 12' of the male end 50. The male end 50 is defined by the tubing member 11 with tube wall 12' and inner and outer surfaces 13' and 14'. The inner surface 13' has an annular ledge 51 thereon and a chamfer 52 formed internally at an end of the inner ledge 51 adjacent an opening 53; the chamfer 52 is for facilitating the insertion of a leveling device 70 therein.

FIG. 9 illustrates a length of corrugated pipe 30 inserted into the female end 20 so that pipe end 33 contacts the annular ring 54 which comprises the stop means. It should be noted that the female end 20 deforms along the receiving length 21, again denoted as deformation d in the same manner as substantially described above, so as to create a gravity flow water-tight seal between the corrugated pipe 30 and the female connector end 20. In addition, a clamping means, such as a radiator clamp 40, can again be used, if desired, in conjunction with the male-to-female flexible pipe connector 100 to create a pressure fluid-tight seal between the corrugated pipe 30 and the female connector end 20.

A septic system drop box 63 is illustrated in FIG. 10 as including three flexible seal members 60, two being oppositely placed on the lower portion of the box walls 62 and one being in partial front view. (For reference purposes, such an injection-molded septic system drop box, like box 63, is described in more detail in U.S. Pat. No. 4,663,036.) A male-to-female flexible pipe connector 100 is shown as inserted into each of the lower flexible seal members 60. Each female connector end 20 has disposed therein a length of corrugated pipe 30 so as to form a fluid-tight seal therebetween. The male end 50 of each connector 100 is inserted into each flexible seal member 60 such that the forward wiper 61 engages the outer diameter of the male end 50 creating a water-tight seal therebetween. A leveling device 70 (such as sold by the assignee of the present application under the trademark Speed Leveler) is inserted into the opening 53 of each male end 50, such that the rotable passage 74 thereof may be adjustably rotated to properly level the flow of water or effluent out of the drop box 63 through the associated pipe 30.

FIG. 11 more clearly illustrates (in exploded view) the male-to-female flexible pipe connector 100 with the male end 50 inserted into the flexible seal member 60, the latter being secured to drop box wall 62. The flexible seal member 60 has a wiper element 61 extending from its inner periphery which acts to releasably fluid-tightly seal the male end 50 of connector 100 into the opening 63 defined by the flexible seal member 60. (For a more detailed explanation and description of the features of the flexible seal member 60 and its advantages, reference may again be had to U.S. Pat. No. 4,663,036.)

FIG. 11 also illustrates the leveling device 70 having an insertion collar 71 with a reverse wiper 72 disposed on an end thereof and a faceplate 73 disposed on an opposite end thereof. The faceplate 73 is connected to the insertion collar 71 with the faceplate 73 including a rotable passage 74. The faceplate 73 has disposed about its periphery a plurality of gripping tabs 75 to facilitate the rotation of the leveling device 70 once inserted into the connector male end 50. By such rotation the passage 74 can appropriately level the flow of water into the pipe 30 versus the other pipe 30.

In use, the leveling device 70 is inserted into the male end 50 of the male-to-female flexible pipe connector 100 as shown in FIG. 10. It should be noted that the connector male end 50 has first been inserted into the flexible seal member 60 until the annular ring 53 almost abutts against a side of the flexible seal member 60. When the leveling device 70 is inserted into the male end 50, the inner ledge 51 allows the reverse wiper 72 to easily pass longitudinally into the opening 53 until the reverse wiper 72 contacts the ledge end 58. Once the reverse wiper 72 contacts the ledge end 58, axial force can be applied to faceplate 73 so as to force the speed leveler 70 into the male end 50 until the rear side of faceplate 73 contacts the end of tube wall 12 of the male end 50. In this position, the inner surface of the tube wall 12 will cause the reverse wiper 22 to resiliently deform releasably locking the leveling device 70 into the male end 50. Although the reverse wiper 72 releasably interlocks the speed leveler 70 into the male end 50, the speed leveler 70 can still be rotated by gripping the gripping tab 75 and rotably twisting the faceplate 73 until the rotable passage 74 is in proper alignment, i.e., proper vertical height, relative to the desired water level 78.

Thus, it is seen that the flexible connector of the male-to-female design, of the present invention advantageously allows use of a leveling device with corrugated pipe, which is not achievable with corrugated pipe alone.

FIG. 12 illustrates the female-to-female flexible pipe connector 10 used in conjunction with a dual-wall co-extruded pipe 80. The dual-wall co-extruded pipe 80 has an outer wall 81 having a longitudinal series of crests 82 and valleys 83. In addition, the co-extruded pipe 80 has a smooth inner wall 84. As is known, the walls 81 and 84 are formed together, i.e., co-extruded, when pipe 80 is formed. The female-to-male flexible pipe connector 10 of the present invention can be used to effectuate a gravity flow water-tight seal between lengths of dual-wall co-extruded corrugated pipe 80. While different manufacturers' co-extruded corrugated pipe may have different size specifications, co-extruded pipe 80 typically has an outer diameter (i.e., usually approximately 4.75 inches in diameter) that is slightly larger than the diameter (usually approximately 4.65 inches) of corresponding 1500 lb. crush-type flexible corrugated pipe 30. However, the female-to-female flexible pipe connector 10 is constructed so that it can stretch further to sealably accommodate such a larger nominal diameter of such dual-wall co-extruded pipe 80. That is, since the dual-wall co-extruded corrugated pipe 80 has a larger outer diameter than the corresponding corrugated pipe, the receiving length 21 of the female end 20 stretches a greater amount when used with such dual-wall co-extruded pipe 80. FIG. 12 illustrates how the cylindrical connector wall 12 stretches over the multiple crests 82 and is then stretchably deformed into the valleys 83 between each pair of crests 82. Again, this stretching of the wall 12 (about crests 82) creates a gravity flow water-tight seal via a connector 10 between lengths of co-extruded pipe 80. Also, connector 10 can be used to effectuate a pressure water-tight seal through the use of a clamp means, such as a clamp 40 over a crest 82, in the same manner as described above.

FIG. 13 illustrates another use of the female-to-female flexible pipe connector 10'. In this embodiment, the pipe connector 10' is used to connect two lengths of smooth-walled, hard plastic pipe 90 into a fluid-tight seal, such as so-called PVC drain pipe. The smooth-walled pipe 90 has a pipe wall 91 and an outer surface 92. The end portion 93 of the smooth-walled pipe 90 is inserted into the mouth 22 of the female end 20 so as to regularly expand the receiving length 21 outwards. In this manner, the flexible pipe connector 10' exerts radially inward forces against the outer surface 92 of the smooth-walled pipe 90 resulting in a substantially fluid-tight engagement between flexible pipe connector and the smooth-walled pipe 90. It should be noted that the flexible pipe connector 10' is essentially the same flexible pipe connector 10 illustrated in FIGS. 1–7, however, the flexible pipe connector 10' would usually be formed to have a smaller inner diameter (than connector 10 used with larger diameter corrugated pipe) so as to sealably accommodate the smooth-walled pipe. That is, the smooth-walled pipe 90 usually has a smaller outer diameter than a corresponding piece of corrugated pipe 30. Typically, a piece of corrugated pipe 30 would have an outer diameter of approximately 4.65 inches while a similar length of smooth-walled pipe 90 will have an outer diameter of approximately 4.40 inches. Accordingly, the flexible pipe connector 10' will normally have an inner diameter of approximately 4.25 inches for use with the smooth-walled pipe 90, while the flexible pipe connector 10 will usually have an inner diameter of 4.50 inches for use with the corrugated pipe 30.

The flexible pipe connector 10 can also be used in conjunction with a clamping means, shown in the figure as radiator clamp 40', to increase the amount of regularly inward compressive forces exerted on the outer surface 92 of the smooth-walled pipe 90. In this manner, the flexible pipe connector 10 can be used to create a pressure flow fluid-tight seal between the flexible pipe connector 10' and the lengths of smooth-walled pipe 90.

Because the thin tube-like walls 12 of the flexible pipe connector 10 or 100 of the present invention are stretchable and flexible, they can readily accommodate connecting two corrugated pipes where one pipe end is somewhat angularly aligned, or is not axially concentrically aligned, relative to the abutting other pipe end. That is, because of the flexibility of the wall 12 of a connector 10, and further, because of the length of the receiving length 21, either wall 12 of a connector 10 can be somewhat angularly disposed, relative to end wall 23, to accommodate such an angularly aligned or non-concentrically aligned corrugated pipe 30.

From the foregoing, it is believed that those skilled in the art will readily appreciate the unique features and advantages of the present invention over previous types of connectors for use with corrugated and smooth-walled pipe. Further, it is to be understood that while the present invention has been described in relation to particular preferred and alternate embodiments as set forth in the accompanying drawings and as above described, the same nevertheless are susceptible to change, variation and substitution of equivalence without departure from the spirit and scope of this invention. It is therefore intended that the present invention be unrestricted by the foregoing description and drawings, except as may appear in the following claims.

We claim:

1. A flexible pipe connector for connecting lengths of corrugated pipe, said connector comprising:

a flexible and stretchable tube member having a cylindrical wall with a thickness of approximately 0.02 to 0.04 inches and inner and outer surfaces, said member defining at least one female end having a receiving length with a mouth at a first end and a stop means formed at a second end, said mouth being adapted to slideably receive an end of said corrugated pipe until said pipe end contacts said stop means; wherein said receiving length is capable of stretching sufficiently radially outward and exerting sufficient radially inward compressive forces to create a water-tight seal when a corrugated pipe end is inserted into said receiving length.

2. The invention of claim 1, wherein said tubing is comprises of a linear low density polyethylene.

3. The invention of claim 1, and wherein said cylindrical wall has a thickness of approximately 0.030 inches.

4. The invention of claim 1, wherein said stop means comprises an annular flange disposed on said inner surface of said cylindrical wall, said annular flange being substantially perpendicular to a longitudinal axis of said cylindrical wall and being adapted to prevent said pipe end from further insertion into said mouth and receiving length of said female end of said connector.

5. The invention of claim 1, wherein a section of the said inner surface adjacent said mouth is chamfered to facilitate insertion of said pipe end into said mouth 6. The invention of claim 1, wherein said female end is adapted to stretch so as to receive both dual-wall co-extruded corrugated pipe ends and 1500 lb. crush corrugated pipe ends.

7. The invention of claim 1, wherein a clamping means is positioned about an outer diameter of said cylindrical wall to be releasably tightened once said corrugated pipe end is inserted said distance into said receiving length, said clamping means operable to increase the radially inward compressive forces against said corrugated pipe end so as to effectuate a pressure flow water-tight seal between said corrugated pipe and said connector.

8. The invention of claim 8, wherein a plurality of annular ribs are disposed on said outer surface of said cylindrical wall to assist in positionally locating said clamping means on said connector.

9. The invention of claim 8, wherein said clamping means comprises an adjustable radiator clamp made of stainless steel.

10. The invention of claim 1, wherein said tube member includes two opposed and coupled said female ends for receiving two separate abutting lengths of said corrugated pipe therein.

11. The invention of claim 10, wherein said male and female connector ends are connected by an annular wall member, said annular wall member forming said stop means for said female end.

12. The invention of claim 11, wherein said annular wall member is substantially perpendicular to a longitudinal axis of said cylindrical wall member.

13. The invention of claim 1, wherein said tube member further defines a male connector end coupled to said female connector end.

14. The invention of claim 13, wherein said male connector end has an inner surface, said inner surface having an inner ledge for receiving a flexible wiper element of a leveling device.

15. A female-to-female flexible pipe connector for connecting two lengths of corrugated pipe, said female-to-female pipe connector comprising:

a flexible, stretchable tube member having a cylindrical wall with a thickness of approximately 0.02 to 0.04 inches and inner and outer surfaces, said tube member having at each end thereof a female end having a receiving length with a mouth at a first end and a stop means at a second end, each said mouth being adapted to slideably receive an end of said corrugated pipe so that said pipe end can be inserted a sufficient sealing distance into the receiving length until said pipe end contacts said stop means, wherein said receiving length of each said female end is capable of stretching sufficiently radially outward and exerting sufficient radially inward compressive forces to create a water-tight seal when a corrugated pipe end is inserted into said receiving length.

16. The invention of claim 15, wherein said stop means comprises an annular flange disposed on said inner surface of said cylindrical tube wall, said annular flange being substantially perpendicular to a longitudinal axis of said tube member and being adapted to prevent said pipe ends of each respective length of corrugated pipe from further insertion into said mouth and receiving length of each said female end.

17. A male-to-female flexible pipe connector comprising:

a flexible, stretchable tube member having a cylindrical wall with a thickness of approximately 0.02 to 0.04 inches and inner and outer surfaces, said tube member defining at opposite ends thereof a female connector end and a male connector end, said female end having a receiving length with a mouth at a first end and a stop means at a second end, said mouth being adapted to slideably receive an end of a corrugated pipe so that said pipe end can be inserted a sufficient sealing distance into said receiving length until said pipe end contacts said stop means; wherein said receiving length is capable of stretching sufficiently radially outward and exerting sufficient radially inward compressive forces to create a water-tight seal when a corrugated pipe end is inserted into said receiving length.

18. The invention of claim 17, wherein said inner surface of said male end includes an inner ledge member formed thereon for receiving a flexible wiper element of a leveling device.

19. The invention of claim 17, wherein said stop means comprises an annular wall which connects said male and female ends.

20. The invention of claim 19, wherein said annular wall is substantially perpendicular to a longitudinal axis of said tube member and connects said cylindrical wall of said female connector end to said cylindrical wall of said male connector end.

21. A flexible pipe connector for connecting lengths of smooth-walled pipe, said connector comprising:

a flexible stretchable tube member having a cylindrical wall with inner and outer surfaces, said member defining at least one female end having a receiving length with a mouth at a first end and a stop means formed at a second end, said mouth being adapted to slideably receive an end of said smooth-walled pipe until said pipe end contracts said stop means; wherein said receiving length is capable of stretching sufficiently radially outward and exerting sufficient radially inward compressive forces to create a water-tight seal when a smooth-walled pipe end is inserted into said receiving length.

22. The invention of claim 21, wherein a clamping means is positioned about an outer diameter of said cylindrical wall to be releasably tightened once said smooth-walled pipe end is inserted said distance into said receiving length, said clamping means operable to increase the radially inward compressive forces against said smooth-walled corrugated pipe end so as to effectuate a pressure flow water-tight seal between said smooth-walled pipe and said connector.

23. The invention of claim 22, wherein a plurality of annular ribs are disposed on said outer surface of said cylindrical wall to assist in postionally locating said clamping means on said connector.

24. The invention of claim 22, wherein said clamping means comprises an adjustable radiator clamp made of stainless steel.

25. A combination pipe joint comprising:

a first corrugated pipe having a plurality of crests and valleys and having an end;

a second corrugated pipe having a plurality of crests and valleys and an end; and a flexible, stretchable connecting tube member having a cylindrical wall with a thickness of approximately 0.02 to 0.04 inches and inner and outer surfaces, said tube member including a pair of female connector ends each slideably receiving one of said ends of said first and second corrugated pipes, each of said female connector ends including a receiving length stretched radially outward along a length of said corrugated pipes that are inserted in each of said female connector ends, wherein said receiving lengths exert radially inward compressive forces against said corrugated pipe ends and tightly grip said crests of said corrugated pipes to create a water-tight seal between said first and second corrugated pipes and said tube member.

26. The pipe joint of claim 25 in which said tube member is comprised of a linear low density polyethalyne.

27. The pipe joint of claim 25 in which said cylindrical wall has a thickness of approximately 0.03 inches.

* * * * *

UNITED STATES PATENT AND TRADEMARK OFFICE
CERTIFICATE OF CORRECTION

PATENT NO. : 5,335,945
DATED : August 9, 1994
INVENTOR(S) : Theodore W. Meyers

It is certified that error appears in the above-indentified patent and that said Letters Patent is hereby corrected as shown below:

In Claim 2, column 9, line 57, "comprises" should be
--comprised--

Signed and Sealed this

Eighteenth Day of October, 1994

Attest:

BRUCE LEHMAN

Attesting Officer     Commissioner of Patents and Trademarks